United States Patent
Eda et al.

[11] Patent Number: 6,097,506
[45] Date of Patent: Aug. 1, 2000

[54] ELECTRICITY TURNING-ON CONTROL DEVICE AND FACSIMILE DEVICE

[75] Inventors: Noriyuki Eda; Toshiya Inotsume; Kenji Iwata, all of Tokyo, Japan

[73] Assignee: Oki Data Corporation, Tokyo, Japan

[21] Appl. No.: 08/832,857

[22] Filed: Apr. 4, 1997

[30] Foreign Application Priority Data

Apr. 5, 1996 [JP] Japan .................................. 8-083591
Oct. 21, 1996 [JP] Japan .................................. 8-278073

[51] Int. Cl.[7] ......................................... H04N 1/32
[52] U.S. Cl. .......................... 358/468; 358/400; 358/442
[58] Field of Search ................................. 399/70, 88, 33, 399/37; 219/216; 395/750; 364/480, 491, 707; 455/38.3, 343; 365/229, 228; 358/434, 437, 438, 468, 400, 1.16, 1.14; 379/100.01, 100.03, 100.02, 100.05; H04N 1/32

[56] References Cited

U.S. PATENT DOCUMENTS 4,365,203 12/1982 DiMassimo et al. ..................... 327/143
5,602,975 2/1997 Kataoka et al. ........................ 358/1.16
5,764,864 6/1998 Sujita ..................................... 358/437

FOREIGN PATENT DOCUMENTS 07 288615 10/1995 Japan .

Primary Examiner—Cheukfan Lee
Attorney, Agent, or Firm—Rabin & Champagne, PC

[57] ABSTRACT

An electricity turning-on control device having a main control section, a main-power source, a power source switch, an operation panel control section, a sub-power source. The main control section has a RAM for storing information regarding an input/output interface and a CPU having a high clock frequency. The operation panel control section has a CPU having a low clock frequency. When no predetermined detecting signal is detected by the operation panel control section for a predetermined time, the power source switch is switched to the electricity turning-off state, thereby turning off supply of electric power to the main control section. On the other hand, when the predetermined detecting signal is detected, the power source switch is switched to an electricity turning-on state, thereby turning on supply of electric power to the main control section, and the main control section establishes a condition regarding the input/output interface on the basis of the information stored in the RAM.

11 Claims, 4 Drawing Sheets

ELECTRICITY TURNING-ON CONTROL DEVICE AND FACSIMILE DEVICE

BACKGROUND OF THE INVENTION

The present invention relates to an electricity turning-on control device placed in a communication terminal unit, an OA device or the like, and to a facsimile device incorporating the electricity turning-on control device.

A facsimile device as a communication terminal unit conventionally has plural control sections including a main control section for controlling the operation of a driving section, an operation panel control section for controlling a switch for main-power source or the like, and a network control unit (hereafter, referred to as NCU) for controlling the operation of a communication line. The main control section controls an electricity turning-on operation of the driving section on the basis of the information from the operation panel control section. The main control section also controls input and output operations of data through the NCU.

The main control section of the facsimile device performs processing for storing received image data in a memory. The main control section also performs compressing, expanding and editing of the image data and further controls the operation of a printing section or the like. It is therefore necessary for the main control section to process a large capacity of image data at high speed. Accordingly, the main control section requires a central processing unit (hereafter, referred to as CPU) in which a clock frequency is high and which is capable of simultaneously processing a large number of bits.

However, if the CPU has the high clock frequency and is capable of simultaneously processing a large number of bits, power consumption required to operate the CPU is increased. For example, if the clock frequency of the CPU is 16 [MHz] and the simultaneously processed bit number is 32, an electric current of approximately 1 [A] flows through the CPU even in its standby state.

Further, since the power source section supplies electric power to the main control section, even in the standby state, electric power is consumed by heat from a transformer.

That is to say, in the conventional communication terminal unit, electric power is supplied to the power source section and each of the control sections even in the standby state so that there is a problem about useless consumption of power.

Moreover, if, in the standby state, the power source section, the supply of electric power to the main control section is turned off, the following problem occurs. When a predetermined detecting signal for starting the operation of the driving section is inputted to the main control section while the power source switch is in the electricity turning-off state, it takes a long time to establish a condition regarding an I/O interface of the main control unit.

SUMMARY OF THE INVENTION

It is an object of the present invention to provide an electricity turning-on control device and a facsimile device capable of reducing power consumed in the standby state, and reducing the time required to establish a condition regarding an I/O interface.

According to one aspect of the present invention, an electricity turning-on control device comprises: a first control section for outputting a first command signal; a first power source for supplying electric power to the first control section; a power source switch for turning on and off supply of electric power to the first power source; a second control section for outputting a second command signal which is used to control an operation of the power source switch; a second power source for supplying electric power to the second control section; and a memory for storing information regarding an input/output interface of the first control section which is set when electric power is supplied to the first control section by the first power source for the first time. When no predetermined detecting signal for starting an operation is detected by the second control section for a predetermined time, the power source switch is switched to an electricity turning-off state on the basis of the second command signal from the second control section, thereby turning off supply of electric power to the first power source and the first control section from the first power source. When a predetermined detecting signal for starting the operation is detected by the second control section while the power source switch is in the electricity turning-off state, the power source switch is switched to an electricity turning-on state on the basis of the second command signal from the second control section, thereby turning on supply of electric power to the first power source and the first control section from the first power source, and the first control section establishes a condition regarding the input/output interface on the basis of the information stored in the memory.

According to another aspect of the invention, a facsimile device comprises: a driving section including an image reading section, a printing section and a hopper sensor for detecting a paper put on a hopper; a network communication unit for transmitting and receiving data with respect to a communication line; a telephone connected to the network control unit; a first control section for outputting a first command signal; a first power source for supplying electric power to the first control section; a power source switch for turning on and off supply of electric power to the first power source; a second control section for outputting a second command signal which is used to control an operation of the power source switch; a second power source for supplying electric power to the second control section; and a memory for storing information regarding an input/output interface of the first control section which is set when electric power is supplied to the first control section by the first power source for the first time. When no predetermined detecting signal for starting an operation is detected by the second control section for a predetermined time, the power source switch is switched to an electricity turning-off state on the basis of the second command signal from the second control section, thereby turning off supply of electric power to the first power source and the first control section from the first power source. When a predetermined detecting signal for starting the operation is detected by the second control section while the power source switch is in the electricity turning-off state, the power source switch is switched to an electricity turning-on state on the basis of the second command signal from the second control section, thereby turning on supply of electric power to the first power source and the first control section from the first power source, and the first control section establishes a condition regarding the input/output interface on the basis of the information stored in the memory.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
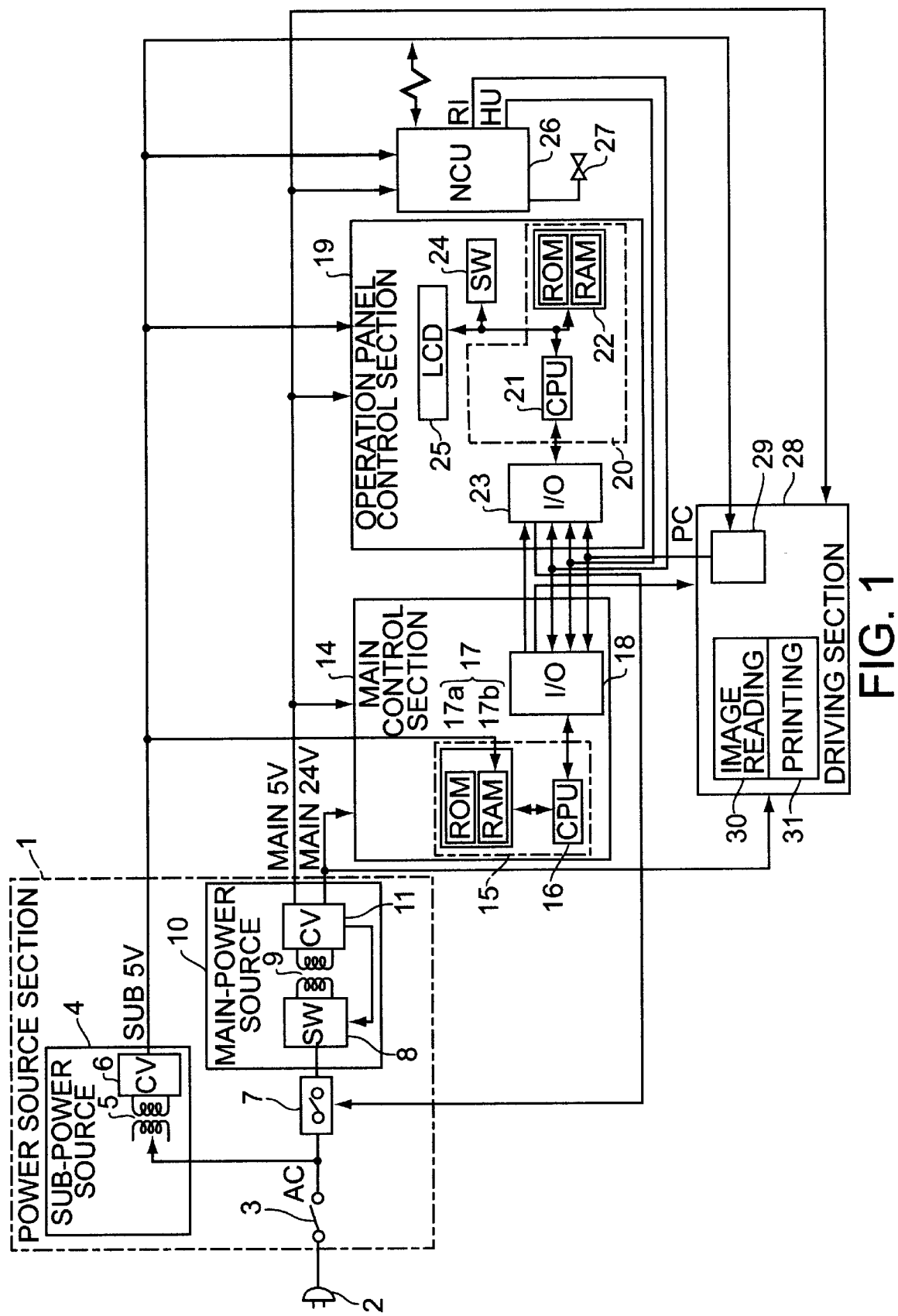
FIG. 1 is a block diagram showing the construction of a facsimile device incorporating an electricity turning-on control device according to a first embodiment of the present invention.

The preferred embodiments of the present invention will next be described with reference to the accompanying drawings. Elements common to the respective drawings are designated by the same reference numerals.

First Embodiment

FIG. 1 is a block diagram showing the construction of a facsimile device incorporating an electricity turning-on control device according to a first embodiment of the present invention. As shown in FIG. 1, the facsimile device has a power source section 1, a main control section 14, an operation panel control section 19, a network control unit (NCU) 26, and a driving section 28 including an image reading section 30 and a printing section 31.

The power source section 1 is provided with a connector 2 connected to an AC power source. The power source section 1 includes a main switch 3 for turning on and off electric power supplied through the connector 2. The power source section 1 also includes a sub-power source 4 for receiving the supply of electric power through the main switch 3, a switch 7 for main-power source, and a main-power source 10 for receiving the supply of electric power through the main switch 3 and the switch 7 for main-power source.

The sub-power source 4 is constructed by a voltage lowering transformer 5 connected to an output terminal of the main switch 3, and a constant voltage (CV) section 6 such as a series regulator. The sub-power source 4 is a constant voltage power source for supplying a constant voltage of +5 [V] from an output terminal of the constant voltage section 6 to the operation panel control section 19, the NCU 26 and a hopper sensor 29 provided in a paper hopper (not shown) of the driving section 28. Furthermore, the constant voltage of +5 [V] from the output terminal of the constant voltage section 6 is also supplied to a RAM 17b of the main control unit 14.

Hereafter, this constant voltage of +5 [V] is noted as "sub +5 [V]".

The switch 7 for main-power source is constructed by a relay (not shown) and a transistor (not shown) as a switching element for operating this relay. Both ends of a contact of the switch 7 for main-power source are respectively connected to an output terminal of the main switch 3 and an input terminal of the main-power source 10. When a main-power source turning-on signal outputted from the operation panel control section 19 is inputted to the switch 7 for main-power source, the contact of the switch 7 is closed so that the main-power source 10 attains an electricity turning-on state. In contrast to this, when a main-power source turning-off signal outputted from the operation panel control section 19 is inputted to the switch 7 for main-power source, the contact of the switch 7 is opened so that the main-power source 10 attains an electricity turning-off state.

The main-power source 10 is constructed by a switching control section 8 connected to an output terminal of the switch 7 for main-power source, a voltage lowering transformer 9, and a constant voltage (CV) section 11 such as a series regulator. The main-power source 10 is a constant voltage power source for supplying voltages of +5 [V] and +24 [V] from the output terminal of the constant voltage section 11. Namely, the main-power source 10 supplies a constant voltage of +5 [V] from the output terminal of the constant voltage section 11 to the main control section 14, the operation panel control section 19, the NCU 26 and the driving section 28. Hereafter, this constant voltage of +5 [V] is noted as "main +5 [V]". The main-power source 10 also supplies a constant voltage of +24 [V] from the output terminal of the constant voltage section 11 to the main control section 14 and the driving section 28. Hereafter, this constant voltage of +24 [V] is noted as "main +24 [V]".

The operation panel control section 19 has a central processing unit (hereafter, referred to as CPU) 21, a memory 22 including a RAM and a ROM, an input/output device (hereafter, referred to as I/O) 23, an operating switch or the like (hereafter, referred to as SW) 24, and an LCD display section 25. These elements are connected to each other through bus lines. The CPU 21 and the memory 22 constitute a main-power source switching control section 20. The CPU 21 receives an arrival detecting signal RI and a hook-up detecting signal HU of a receiver of an externally attached telephone 27 from the NCU 26 through the I/O 23. The CPU 21 outputs a main-power source turning-on signal to the switch 7 for main-power source when the CPU 21 receives the arrival detecting signal RI or the hook-up detecting signal HU.

The main control section 14 has a CPU 16, a memory 17 and an input/output device (hereafter, referred to as I/O) 18, which are connected to each other through bus lines. The memory 17 is constructed by a ROM 17a storing a control program thereinto and a RAM 17b in which various kinds of set values are written. These set values include, for example, I/O interface information of the I/O 18 which is set when electric power is supplied to the main control section 14 by the main-power source 10 for the first time.

The arrival detecting signal RI and the hook-up detecting signal HU of the receiver are inputted to the CPU 16 from the NCU 26 through the I/O 18. A paper detecting signal PC of the hopper sensor 29 is inputted to the CPU 16 from the driving section 28 through the I/O 18.

The CPU 16 and the memory 17 constitute a main-power source turning-off request section 15, and output a main-power source turning-off request command to the main-power source switching control section 20, when the CPU 16 does not receive the arriving detecting signal RI from the NCU 26, the hook-up detecting signal HU from the telephone 27 and the paper detecting signal PC of the hopper sensor 29 from the driving section 28 within a predetermined time after data processing is terminated.

The CPU 16 is connected to the driving section 28 through the I/O 18. For example, when the switch 7 for the main-power source is turned on, the CPU 16 detects that a paper is set to the paper hopper by the paper detecting signal PC of the hopper sensor 29, and calls a destination on the basis of an operation of the SW 24 of the operation panel control section 19. The image of the paper is read by the image reading section 30 by pushing down a start key, and image data is transmitted through the NCU 26. In another case, when the switch 7 for main-power source is turned on, automatic signal reception is started on the basis of the arrival detecting signal RI received by the NCU 26 and a printing operation is performed by the printing section 31.

In the description of this embodiment, an output of the SW 24 is referred to as an operating signal. The arrival detecting signal RI from a public communication line, the hook-up detecting signal HU of the receiver and the detecting signal PC outputted from the hopper sensor 29 when setting the paper on the paper hopper are generally referred to as a driving request signal.

As has been described, the main control section 14 performs control processing for storing image data to the memory 17 and also controls the operation of a driving section 28, for example, compressing, expanding and editing of the image data. In these controls, it is necessary to process a large capacity of image data at high speed. Accordingly, the main control section 14 uses the CPU 16 in which a clock frequency is high and which is capable of simultaneously processing the large number of bits. For example, if the clock frequency of the CPU is 16 [MHz] and the simultaneously processed bit number is 32, an electric current of approximately 1 [A] flows through the CPU 16 even in its standby state.

On the other hand, high speed processing is not required in the operation panel control section 19 in comparison with the main control section 14. Accordingly, the CPU 21 can be constructed by using a CPU in which the clock frequency is low and which is capable of simultaneously processing a small number of bits. For example, the CPU 21 may be operated by using a CPU in which the clock frequency is 100 [KHz] and the simultaneously processed bit number is 4. Accordingly, an electric current flowing through the CPU 21 in its standby state is about $\frac{1}{100}$(i.e., about 10 [mA]) times the electric current flowing through the CPU 16 of the main control section 14. Therefore, power consumption of the operation panel control section 19 is very small.

Furthermore, information relative to a port of an I/O 18 which was set at a first rising time of the main control section 14 is stored to a predetermined area of the RAM 17b. Information for turning-off the main-power source 10 is written to a predetermined address of the RAM 17b by the CPU 16 before a main-power source turning-off request section 15 of the main control section 14 outputs a main-power source turning-off request command to a main-power source switching control section 20 of the operation panel control section 19.

Accordingly, the CPU 16 reads contents at the predetermined address of the RAM 17b at a second rising time of the main control section 14 or later. Thus, since it is not necessary to again set the port of the I/O 18 or the like, a time for performing a rising operation can be shortened.

Figure 2:
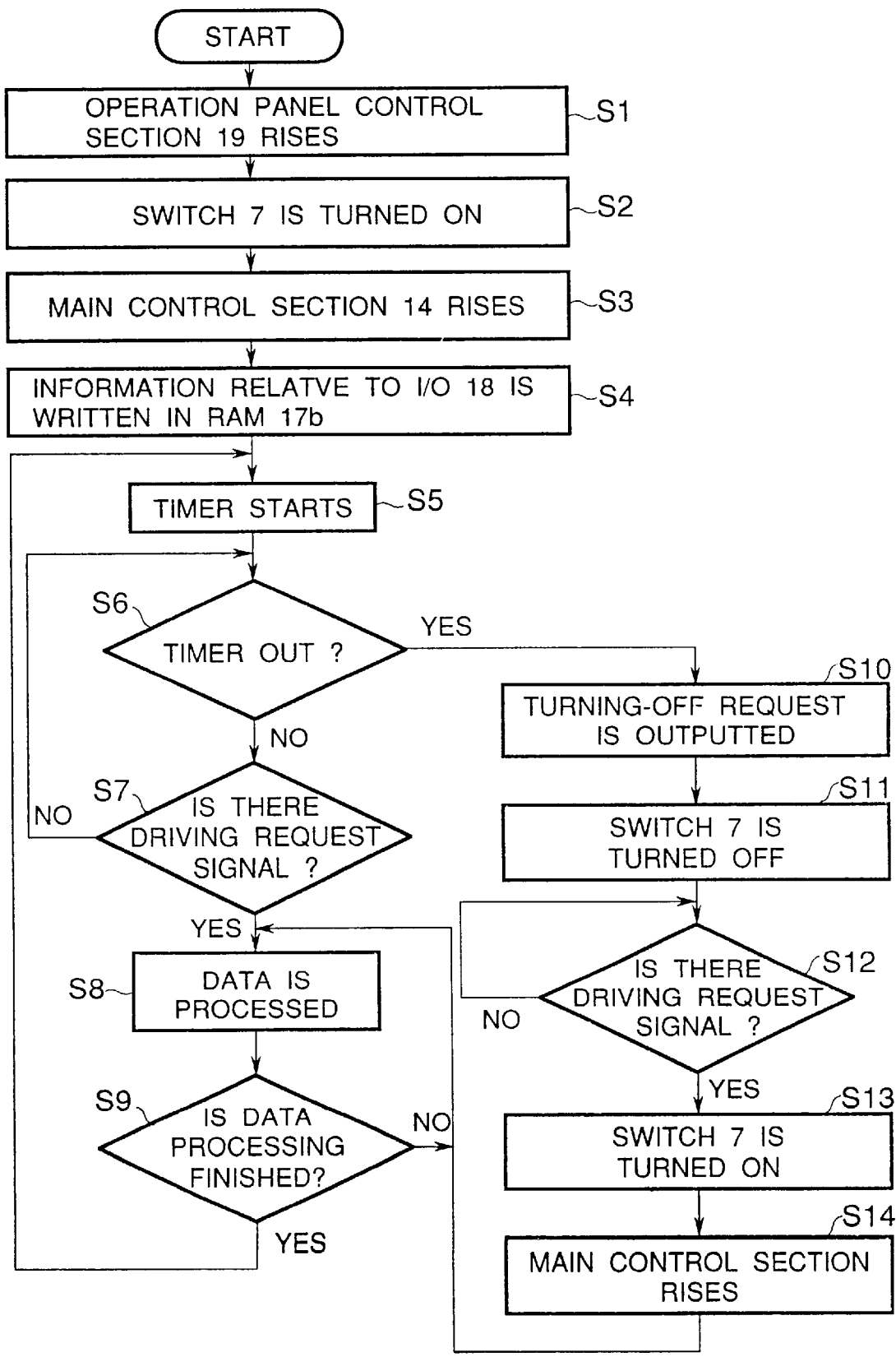
FIG. 2 is a flow chart showing an operation of the facsimile device of FIG. 1.

FIG. 2 is a flow chart for explaining an operation of the facsimile device of FIG. 1.

The operation will next be explained with reference to FIG. 1 and FIG. 2.

First, the connector 2 is plugged into the AC power source and the main switch 3 is turned on. Thus, power is supplied to the sub-power source 4. The sub-power source 4 supplies a constant voltage of sub +5 [V] to the operation panel control section 19, the RAM 17b, the NCU 26 and the hopper sensor 29.

In a step S1, each of the operation panel control section 19 and the NCU 26 having the supplied constant voltage of sub +5 [V] rises, is initialized and attains a standby state. At this time, the display section 25 of the operation panel control section 19 displays that the standby state is set.

In the next step S2, the main-power source switching control section 20 of the operation panel control section 19 outputs a main-power source turning-on signal to the switch 7 for main-power source so that the switch 7 for main-power source is turned on. Since the switch 7 for main-power source attains an electricity turning-on state, AC power is supplied to the main-power source 10. At this time, the constant voltage section 11 of the main-power source 10 supplies a constant voltage of main +5 [V] to the main control section 14, the operation panel control section 19, the NCU 26 and the driving section 28. The constant voltage section 11 of the main-power source 10 also supplies a constant voltage of main +24 [V] to the main control section 14 and the driving section 28.

In a step S3, the CPU 16 of the main control section 14 receiving the supplies of the main +5 [V] and the main +24 [V] initializes the main control section 14.

In a step S4, information relative to a port of an I/O 18 which was set at a first rising time of the main control section 14 is written to a predetermined area of the RAM 17b. Information for turning off the main-power source 10 is also written to a predetermined address of the RAM 17b by the CPU 16.

In a step S5, the CPU 16 starts a timer and attains a standby state.

In a step S6, the CPU 16 checks whether the timer is out or not. If the timer is out, processing proceeds to a step S10. In contrast to this, if the timer is not out, processing proceeds to a step S7. When processing proceeds to the step S7, the CPU 16 checks whether there is a driving request signal (RI, HU, PC) or not. If there is a driving request signal, processing proceeds to a step S8. In contrast to this, if there is no driving request signal, processing returns to the step S6.

In a step S8, when the driving request signal is outputted from the hopper sensor 29, the CPU 16 operates the image reading section 30, processes the read data and outputs the data from the NCU 26 to a public communication line on the basis of the operation of an operation panel. In contrast to this, when the driving request signal is received from the NCU 26, the CPU 16 processes the data received from the public communication line through the NCU 26 and executes a printing operation by the printing section 31 on the basis of the received data.

In the next step S9, the CPU 16 checks whether the data processing is finished or not. If the CPU 16 judges that the data processing is finished, processing is returned to the step S5. In contrast to this, if the CPU 16 judges that data processing is not finished, processing returns to the step S8.

When processing proceeds from the step S6 to the step S10, the main-power source turning-off request section 15 of the main control section 14 outputs a main-power source turning-off request command to the main-power source switching control section 20 of the operation panel control section 19.

In the next step S111, the main-power source switching control section 20 outputs a main-power source turning-off signal to the switch 7 for main-power source, and the display section 25 displays that the main-power source 10 is in the turning-off state. Since the switch 7 for main-power source is thus set to the turning-off state, the supply of the constant voltage of the main +5 [V] to the main control section 14, the operation panel control section 19, the NCU 26 and the driving section 28 is stopped. Further, the supply of the constant voltage of the main +24 [V] to the main control section 14 and the driving section 28 is stopped.

In the next step S12, the CPU 21 of the main-power source switching control section 20 judges whether or not there is a driving request signal RI, HU, or PC from the NCU 26 or the hopper sensor 29. If there is a driving request signal, processing proceeds to a step S13. In contrast to this, if there is no driving request signal, processing is again returned to the step S12.

When processing proceeds from the step S12 to the step S13, the main-power source switching control section 20 of the operation panel control section 19 outputs a main-power source turning-on signal to the switch 7 for main-power source so that the switch 7 for main-power source is turned on. Since the switch 7 for main-power source attains the electricity turning-on state, the AC power is supplied to the main-power source 10 and a constant voltage of main +5 [V] is supplied from the constant voltage section 11 to the main control section 14, the operation panel control section 19, the NCU 26 and the driving section 28. When the AC power is supplied to the main-power source 10, a constant voltage of main +24 [V] is supplied from the constant voltage section 11 to the main control section 14 and the driving section 28.

In the next step S14, the CPU 16 having the supplied constant voltages of the main +5 [V] and the main +24 [V] rises the main control section 14 and reads the contents at the predetermined address of the RAM 17$b$ so that it is not necessary to again set the port of the I/O 18 or the like.

The CPU 16 transmits and receives data with respect to the CPU 21 and detects a turning-on factor of the main-power source 10. For example, if the turning-on factor is a receiving signal RI, the CPU 16 attains an operating state of automatic signal reception. In contrast to this, if the turning-on factor is the paper detecting signal PC indicating that a paper is set to the paper hopper, the CPU 16 starts an image reading operation using a paper feed motor, the image reading section, an image data memory or the like so that processing proceeds to the step S8.

As explained above, in the first embodiment, the power supply to the main-power source 10 is stopped and only a constant voltage from the sub-power source 4 is supplied when no predetermined driving request signal is detected while a predetermined time has passed. Accordingly, useless power consumption in the power source section and the control sections in the standby state can be reduced.

Furthermore, in the first embodiment, a constant voltage is supplied from the sub-power source 4 to the RAM 17$b$ of the main control section 14 even while the supply of power from the main-power source 10 is stopped. Accordingly, the CPU 16 can read the contents at the predetermined address of the RAM 17$b$ at the second rising time of the main control section 14 or later so that it is not necessary to again establish the condition regarding the port of the I/O 18 or the like. Therefore, a time for changing a low power consuming state to an operating state can be shortened and processing in reception of an arrival detecting signal RI of the NCU 26 can be rapidly performed.

Second Embodiment

A facsimile device incorporating an electricity turning-on control device according to a second embodiment of the present invention differs from that according to the first embodiment with respect to only the following points. Namely, a main-power source switching control section 20 of the operation panel control section 19 of the second embodiment has a function of storing information (i.e., driving request source information) for informing the main control section 14 of a driving request source in accordance with any one of a hook-up detecting signal HU and an arrival detecting signal RI, and a function of reading and holding the driving request source information in accordance with the received detecting signal when the hook-up detecting signal HU or the arrival detecting signal RI is received. Further, a main-power source turning-off request section 15 of the main control section 14 of the second embodiment has a function of requiring the driving request source information from the operation panel control section 19 in accordance with the hook-up detecting signal HU or the arrival detecting signal RI. FIG. 1 is also referred in the description of the second embodiment.

In the above described first embodiment, the operation panel control section 19 outputs the main-power source turning-on signal without discriminating the arrival detecting signal RI and the hook-up detecting signal HU from each other when the arrival detecting signal RI or the hook-up detecting signal HU of a receiver of the externally attached telephone 27 is received from a public communication line. Accordingly, in the first embodiment, after a rising operation of the main control section 14 is terminated, the main control section 14 must judge whether the driving request signal is provided from the arrival detecting signal RI or the hook-up detecting signal HU.

In contrast, in the second embodiment, the facsimile device is constructed in such a way that the driving request source information of "a main-power source turning-on signal request by the arrival detecting signal RI" and "a main-power source turning-on signal request by the hook-up detecting signal HU" are stored in advance to the memory 22 of the operation panel control section 19. When the CPU 21 receives each of these signals, the driving request source information is read out of the memory 22 in accordance with the received signal and is held in a register of the CPU 21.

After the rising operation of the main control section 14 is terminated, the CPU 16 sends an information transmitting request command to the CPU 21 so that the CPU 21 sends the driving request source information to the CPU 16.

Accordingly, after the rising operation of the main control section 14 is terminated, it is not necessary for the main control section 14 to judge whether the driving request signal is provided from the arrival detecting signal RI or the hook-up detecting signal HU.

Except for the above description, the construction of the facsimile device incorporating the electricity turning-on device of the second embodiment is the same as that of the first embodiment.

Figure 3:
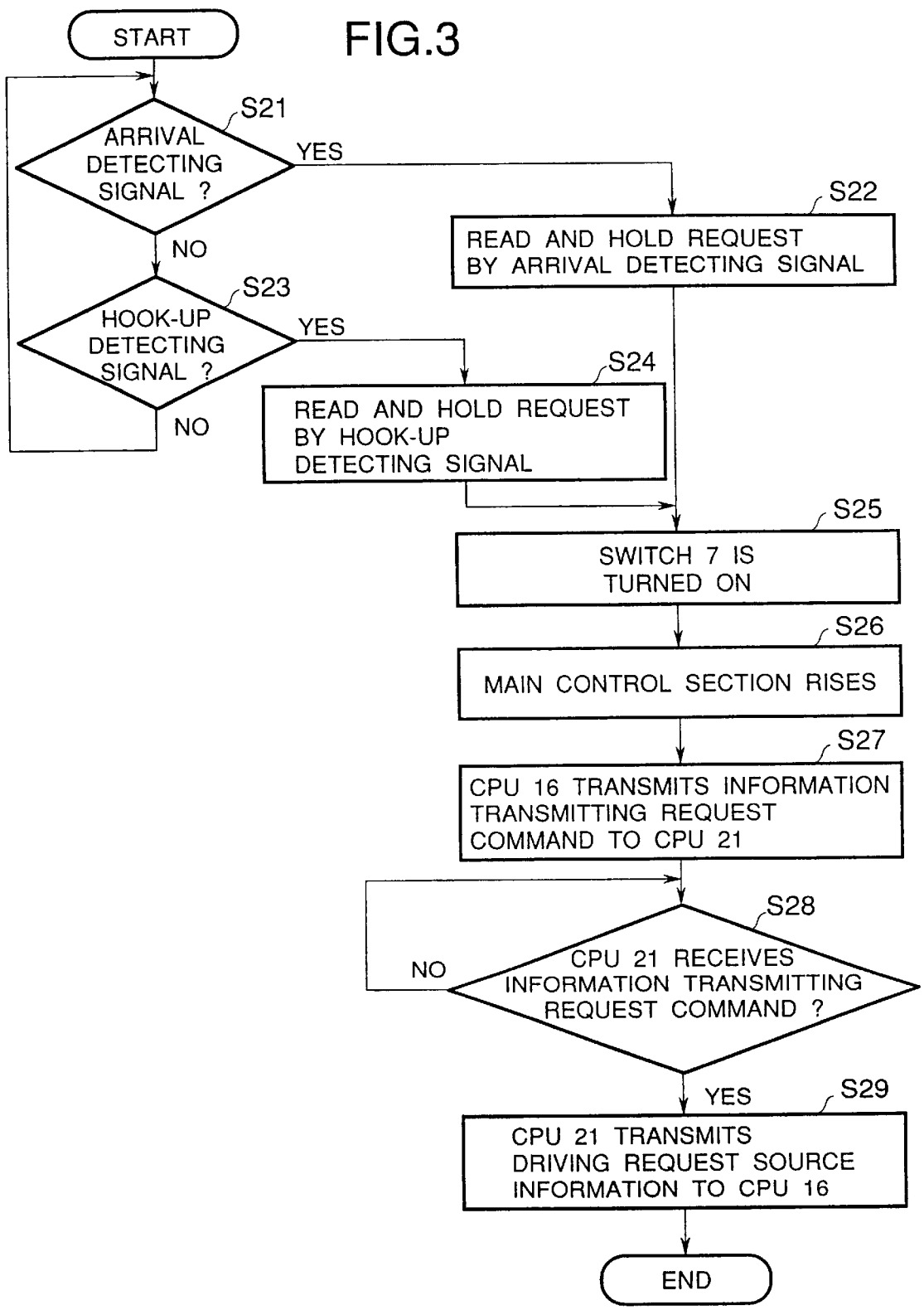
FIG. 3 is a flow chart showing an operation of a facsimile device incorporating an electricity turning-on control device according to a second embodiment of the present invention.

FIG. 3 is a flow chart for explaining the operation of the facsimile device according to the second embodiment. In the second embodiment, the steps S12 to S14 in FIG. 1 are replaced by the steps S21 to S29 in FIG. 3.

As shown in FIG. 3, in a step S21, the CPU 21 checks whether the driving request signal is an arrival detecting signal RI or not. If the driving request signal is the arrival detecting signal RI, processing proceeds to a step S22. In contrast to this, if the driving request signal is not the arrival detecting signal RI, processing proceeds to a step S23.

In the step S22, the CPU 21 reads "a main-power source turning-on signal request by the arrival detecting signal RI" as driving request source information from the memory 22, and holds this request in a register of the CPU 21. In the step S25, the CPU 21 outputs a main-power source turning-on signal to the switch 7 for main-power source so that the switch 7 for main-power source attains an electricity turning-on state, and in the step S26, the CPU 16 of the main control section 14 rises.

When processing proceeds from the step S21 to the step S23, the CPU 21 checks whether the driving request signal is a hook-up detecting signal HU or not. If the driving request signal is the hook-up detecting signal HU, processing proceeds to a step S24. In contrast to this, if the driving request signal is not the hook-up detecting signal HU, processing returns to the step S21 and the CPU 21 again checks whether the driving request signal is the arrival detecting signal RI or not.

When processing proceeds to the step S24, the CPU 21 reads "the main-power source turning-on signal request by the hook-up detecting signal HU" as driving request source information from the memory 22, and holds this request in the register of the CPU 21. Further, the CPU 21 outputs a main-power source turning-on signal to the switch 7 for main-power source.

In the step S25, the switch 7 for main-power source receives a main-power source turning-on signal from the CPU 21 so that the switch 7 for main-power source attains an electricity turning-on state, and in the step S26, the CPU 16 of the main control section 14 rises.

In the next step S27, when a rising operation of the main control section 14 is terminated, the CPU 16 receives the driving request signal and transmits an information transmitting request command to the CPU 21.

In the next step S28, the CPU 21 senses the information transmitting request command. When the CPU 21 receives the information transmitting request command, the CPU 21 transmits the driving request source information held in the register of the CPU 21 to the CPU 16 in a step S29.

As described above, in accordance with the second embodiment, after the rising operation of the main control section 14 is terminated, it is not necessary for the main control section 14 to check whether the driving request signal is provided from the arrival detecting signal RI or the hook-up detecting signal HU. Accordingly, the CPU 16 does not bear checking of the driving request signal so that it is possible to rapidly transfer to an operation for processing the arrival detecting signal RI or the hook-up detecting signal HU.

Third Embodiment

Figure 4:
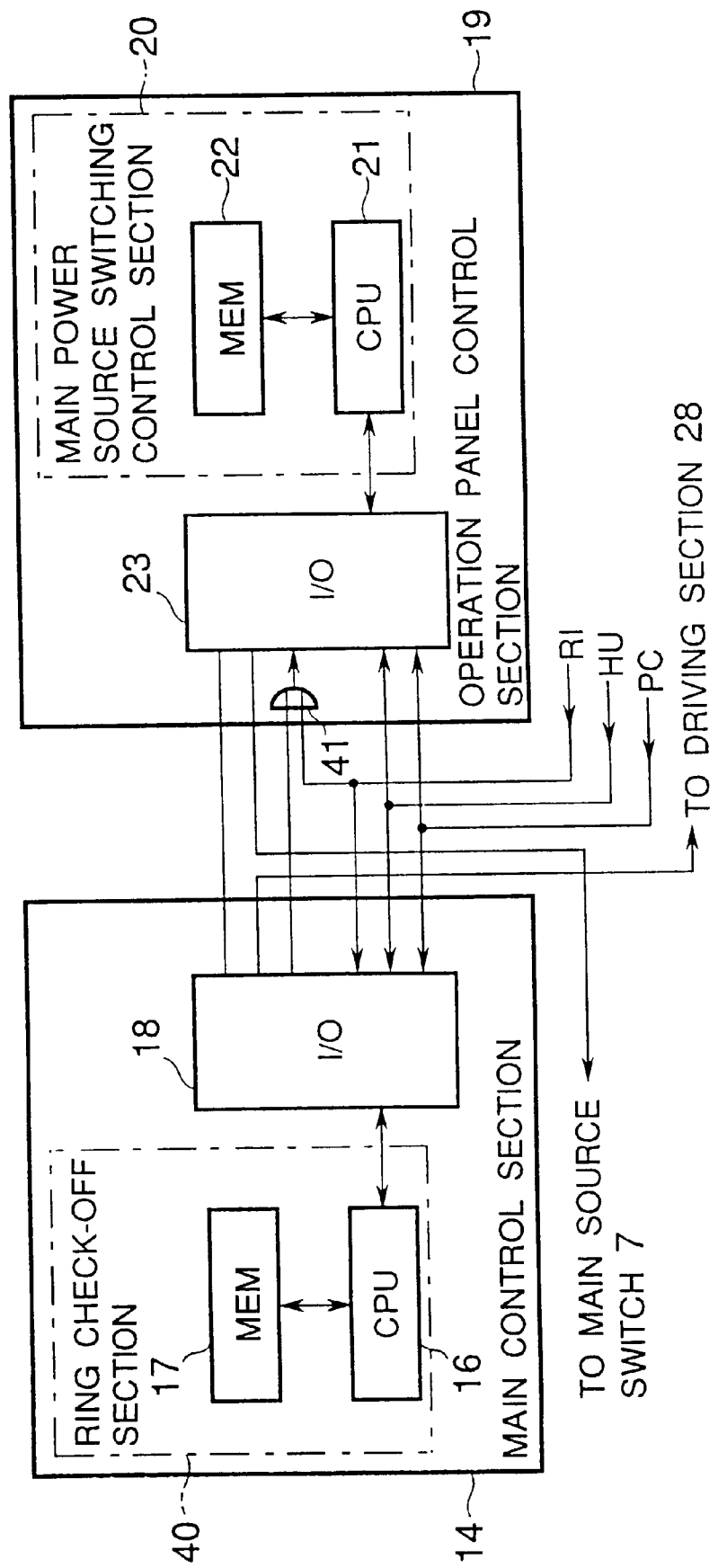
FIG. 4 is a block diagram showing a part of the construction of a facsimile device incorporating an electricity turning-on control device according to a third embodiment of the present invention.

FIG. 4 is a block diagram showing a part of a facsimile device incorporating an electricity turning-on control device according to a third embodiment of the present invention. The facsimile device in the third embodiment differs from that in the first embodiment with respect to the following points. Namely, the main control section 14 of the third embodiment has a ring check-off section 40 for invalidating an arrival detecting signal RI when the facsimile device is set to a telephone mode by, for example, a selector switch (not shown). The operation panel control section 19 of the third embodiment has an arrival detecting signal invalidating section 41 which is composed of an OR circuit. The arrival detecting signal invalidating section 41 receives the arrival detecting signal RI and an output of the ring check-off section 40, and outputs an arrival invalidating signal to the main-power source switching control section 20.

The ring check-off section 40 includes a CPU 16 and a memory 17. When the facsimile device is set to the telephone mode, the ring check-off section 40 outputs a signal at a high voltage level. When the facsimile device is set to the facsimile mode, the ring check-off section 40 outputs a signal at a low voltage level.

The arrival detecting signal invalidating section 41 receives the arrival detecting signal RI and the output of the ring check-off section 40, and outputs a signal at a high voltage level in the telephone mode. In the facsimile mode, the arrival detecting signal invalidating section 41 outputs a pulse signal synchronized with the arrival detecting signal RI.

The main-power source switching control section 20 makes the arrival detecting signal RI invalid, when the main-power source switching control section 20 receives the signal at a high voltage level from the arrival detecting signal invalidating section 41. When the main-power source switching control section 20 receives the pulse signal synchronized with the arrival detecting signal RI, the main-power source switching control signal 20 outputs a main-power source turning-on signal to the switch 7 for main-power source so that the switch 7 attains an electricity turning-on state and the main-power source 10 is turned on.

In accordance with the third embodiment, no operation for transferring to an operating state by a ring check is performed in the telephone mode so that main-power source 10 is not turned on in vain and a low power consuming state can be maintained.

Although time displaying function is not described in the third embodiment, time displaying function may be added to the operation panel control section 19 and time may be displayed in the display section such as the LCD 25. Furthermore, only contents of the standby state may be displayed without displaying time during the standby state. When the time displaying function is added, a backup battery or the like for the interruption of the power supply may be preferably installed.

In the above description, the facsimile device has been explained as an example. However, the present invention can be also applied to an OA device having a standby state such as a copying machine or a printer, and Any domestic electrical appliances having a standby state such as a television set or an air conditioner.

What is claimed is:

1. A facsimile device comprising:

a driving section including an image reading section, a printing section and a hopper sensor detecting when paper is placed in a paper hopper;

a network control unit for transmitting and receiving data with respect to a communication line;

a telephone connected to said network control unit;

a main power source;

a sub-power source providing power to said network control unit;

a main power source switch selectively turning on or turning off said main power source responsive to a turn on request or turn off request, respectively;

a main control section powered by said main power source, said main control section determining when a time out has occurred and issuing said turn off request responsive to said determined time out, said main control section including a first CPU having a first clock frequency and a first word width;

an operation control section powered by said sub power source, said operation control section receiving one or more command signals and, responsive to each received command signal, issuing a turn on request when said main power source is turned off, said operation control section including a second CPU having a second clock frequency lower than said first clock frequency and a second word width, said second width being narrower than said first width;

a memory storing input/output interface information for said main control section and wherein;

one command control signal is provided to said operation control section from said network control unit responsive to data through the communication line, and a second command control signal is provided to said operation control section from said network control unit responsive to a hook-up detecting signal;

before said power source switch is switched to an on state, said second CPU receives one said command signal and holds information regarding a corresponding event; and after said power source switch is switched to said on state, said first CPU reads said information regarding said corresponding event and establishes an operating condition of said driving section responsive to said information.

2. A facsimile device comprising:

a main power source;

a network control unit for transmitting and receiving data with respect to a communication line;

a telephone connected to said network control unit;

a sub-power source providing power to said network control unit and said telephone;

a main power source switch selectively turning on or turning off said main power source responsive to a turn on request or turn off request, respectively;

a driving section including an image reading section, a printing section and a hopper sensor detecting when paper is placed in a paper hopper, said image reading section and said printing section being powered by said main power source, said hopper sensor being powered by said sub-power source;

a main control section powered by said main power source, said main control section determining when a time out has occurred and issuing said turn off request responsive to said determined time out;

an operation control section powered by said sub power source, said operation control section receiving one or more command signals including a signal from said network control unit responsive to data through the communication line and another signal from said network control unit responsive to a hook-up detecting signal and, responsive to each received command signal, issuing a turn on request when said main power source is turned off; and a memory storing input/output interface information for said main control section;

wherein, after electric power is supplied to said main control section from said main power source, data is directly inputted to said main control section from said network control unit.

3. The facsimile device of claim 2, wherein:

said main control section includes a first CPU having a first clock frequency and a first word width; and said operation control section includes a second CPU having a second clock frequency lower than said first clock frequency and a second word width, said second width being narrower than said first width.

4. The facsimile device of claim 2, wherein:

said sub; and said hopper sensor generating a command signal responsive to detecting paper being put on said paper hopper.

5. The facsimile device of claim 2, wherein:

said memory is in said main control section; and said sub power source provides power to said memory.

6. The facsimile device of claim 2, wherein:

information for turning-off said main power source switch is initially stored at a predetermined address of said memory, said information being stored in said memory before said main control section issues a first turn off request to said main power source switch.

7. The facsimile device of claim 2, further comprising:

a selector switch for selecting an operating mode of said facsimile, said operating mode including a facsimile mode and a telephone mode; and an arrival detecting signal invalidating section selectively controlling said main control section such that said main power source switch remains unchanged, when said selector switch selects the telephone mode, said power source switch is in an off state and said network control section receives data through the communication line.

8. The facsimile device of claim 2 wherein said time out is determined responsive to said stored interface information stored in said memory.

9. The facsimile device of claim 2, wherein:

when said operation control section does not receive any said one or more command signal for a predetermined time while said main power source switch is in an on state, said main power source switch is switched to an off state responsive to a turn off request from said main control section, thereby turning off said main power source and said main control section; and wherein, when a command signal is received by said operation control section while said main power source switch is in said off state, said main power source switch is switched to said on state responsive to said received command signal, thereby turning on said main power source and said main control section, and said main control section establishes a condition regarding the input/output interface on the basis of said information stored in said memory.

10. The facsimile device of claim 2, wherein:

said turn off request issued by said main control section is transmitted to said operation control section; and said main power source switch turns off said main power source responsive to a turn off request issued by said operation control section.

11. A facsimile device comprising:

a driving section including an image reading section, a printing section and a hopper sensor detecting when paper is placed in a paper hopper;

a network control unit for transmitting and receiving data with respect to a communication line;

a telephone connected to said network control unit;

a main power source;

a sub-power source providing power to said network control unit;

a main power source switch selectively turning on or turning off said main power source responsive to a turn on request or turn off request, respectively;

a main control section powered by said main power source, said main control section determining when a time out has occurred and issuing said turn off request responsive to said determined time out;

an operation control section powered by said sub power source, said operation control section receiving one or more command signals and, responsive to each received command signal, issuing a turn on request when said main power source is turned off;

a memory storing input/output interface information for said main control section; and wherein one command control signal is provided to said operation control section from said network control unit responsive to data through the communication line, and a second command control signal is provided to said operation control section from said network control unit responsive to a hook-up detecting signal, before said power source switch is switched to an on state, said operation control section receives one said command signal and holds information regarding a corresponding event, and after said power source switch is switched to said on state, said main control section reads said information regarding said corresponding event and establishes an operating condition of said driving section responsive to said information.

* * * * *